(12) United States Patent
Davidson

(10) Patent No.: US 11,387,060 B2
(45) Date of Patent: Jul. 12, 2022

(54) SWITCHING APPARATUS

(71) Applicant: General Electric Technology GmbH, Baden (CH)

(72) Inventor: Colin Charnock Davidson, Stafford (GB)

(73) Assignee: General Electric Technology GmbH, Baden (CH)

( * ) Notice: Subject to any disclaimer, the term of this patent is extended or adjusted under 35 U.S.C. 154(b) by 238 days.

(21) Appl. No.: 16/470,043

(22) PCT Filed: Dec. 11, 2017

(86) PCT No.: PCT/EP2017/082131
§ 371 (c)(1),
(2) Date: Jun. 14, 2019

(87) PCT Pub. No.: WO2018/108768
PCT Pub. Date: Jun. 21, 2018

(65) Prior Publication Data
US 2020/0013571 A1 Jan. 9, 2020

(30) Foreign Application Priority Data
Dec. 15, 2016 (EP) .................... 16204367

(51) Int. Cl.
*H01H 33/59* (2006.01)
*H01H 9/40* (2006.01)

(52) U.S. Cl.
CPC ............ *H01H 33/596* (2013.01); *H01H 9/40* (2013.01)

(58) Field of Classification Search
CPC .. H01H 33/596; H01H 33/6662; H01H 9/548; H01H 9/54; H01H 9/40
See application file for complete search history.

(56) References Cited

U.S. PATENT DOCUMENTS

| 4,262,215 A | 4/1981 | Yanabu et al. |
| 2006/0097748 A1* | 5/2006 | Nakayama ............... H03H 7/38 326/17 |
| 2017/0047857 A1* | 2/2017 | She .......................... H02J 3/36 |

FOREIGN PATENT DOCUMENTS

| DE | 102008015437 B3 | 7/2009 |
| FR | 1566251 A | 5/1969 |
| WO | 2010060476 A1 | 6/2010 |

OTHER PUBLICATIONS

Mar. 4, 2016. Coil Inductance Calculator. All about circuits. https://www.allaboutcircuits.com/tools/coil-inductance-calculator/ (Year: 2016).*
International Search Report and Written Opinion, PCT/EP2017/082131, dated Mar. 9, 2018 (11 pp.).

* cited by examiner

*Primary Examiner* — Bryan R Perez
(74) *Attorney, Agent, or Firm* — Eversheds Sutherland (US) LLP

(57) ABSTRACT

A switching apparatus comprises a plurality of current-conductive branches connected in parallel between first and second terminals, each current-conductive branch including at least one respective electrical connection member in series connection with at least one respective gas tube switch between the first and second terminals, wherein the inductance value of each electrical connection member is configured to balance the inductance values of the current-conductive branches.

6 Claims, 4 Drawing Sheets

SWITCHING APPARATUS

RELATED APPLICATIONS

This application claims priority to International Patent Application Serial No. PCT/EP2017/082131, titled "Switching Apparatus", filed Dec. 11, 2017, which claims priority to Europe Application Serial No. 16204367.3, titled "Switching Apparatus", filed Dec. 15, 2016, the contents of which are both incorporated herein by reference.

This invention relates to a switching apparatus, preferably for use in high voltage direct current (HVDC) applications.

It is known to use a switching apparatus that comprises a plurality of switches connected in parallel.

According to an aspect of the invention, there is provided a switching apparatus comprising a plurality of current-conductive branches connected in parallel between first and second terminals, each current-conductive branch including at least one respective electrical connection member in series connection with at least one respective gas tube switch between the first and second terminals, wherein the inductance value of each electrical connection member is configured to balance the inductance values of the current-conductive branches.

It will be understood that, in the switching apparatus of the invention, each current-conductive branch may include a single gas tube switch or a plurality of gas tube switches (e.g. a plurality of series-connected gas tube switches).

It will be also understood that, in the switching apparatus of the invention, each current-conductive branch may include a single electrical connection member or a plurality of electrical connection members (e.g. a plurality of series-connected electrical connection members).

It will be further understood that, in the switching apparatus of the invention, each electrical connection member may take the form of any type of electrically conductive component (e.g. an electrical lead or wiring) capable of connecting a gas tube switch to either of the first and second terminals.

Depending on the switching application, the current rating of a given gas tube switch may be too low to meet the current rating requirements of the switching application.

The parallel connection of the current-conductive branches in the switching apparatus of the invention provides a "gas tube switch"-based switching apparatus with a combined current rating that is higher than the current rating of the individual gas tube switch, and thereby enables the use of gas tube switches in switching applications with higher current rating requirements.

In order to provide a reliable switching apparatus, it is necessary to control the sharing of current between the parallel-connected current-conductive branches.

In a conventional switching apparatus based on parallel-connected power semiconductor switches, the positive slope resistances of the power semiconductor switches are such that current sharing between the parallel-connected power semiconductor switches occurs naturally to a degree, especially if the temperature coefficient is positive. FIG. 1 illustrates the stable current sharing between parallel-connected power semiconductor switches (which are referred to as Device 1 and Device 2 respectively), where there is a stable crossover point between their voltage-current characteristics. In addition, for certain types of power semiconductor switches, gate control can be employed to control the states of the parallel-connected power semiconductor switches in order to rebalance the currents flowing through the parallel-connected power semiconductor switches.

On the other hand, in a switching apparatus based on parallel-connected gas tube switches, it is not possible to obtain stable sharing of current between the parallel-connected gas tube switches. This is because, as shown in FIG. 2 which illustrates the unstable current sharing between parallel-connected gas tube switches, the stable operating points are when all of the current flows through one of the gas tube switches but zero current flows through the other gas tube switch. This is because the negative slope resistances of the gas tube switches are such that there is a tendency of the current to flow through only one or the other of the gas tube switches on either side of the unstable crossover point between their voltage-current characteristics. Moreover it would not be possible to rebalance the currents flowing through the parallel-connected gas tube switches through switching control due to the fact that gas tube switches only have fully-on and fully-off states.

Moreover the inventor has found that assembling the gas tube switches, e.g. side-by-side in a straight line, results in the presence of unequal stray inductance in the electrical connection members which adversely affects the sharing of current between the current-conductive branches.

Configuring the inductance values of the electrical connection members to balance the inductance values of the current-conductive branches advantageously improves the sharing of current between the current-conductive branches based on gas tube switches, thus beneficially improving the reliability of the "gas tube switch"-based switching apparatus.

The switching apparatus may vary in configuration in order to configure the inductance value of each electrical connection member so as to balance the inductance values of the current-conductive branches.

In embodiments of the invention, at least one of the electrical connection members may be or may include a reactor, wherein the inductance value of the or each reactor is configured to balance the inductance values of the current-conductive branches.

In such embodiments, the or each reactor may be arranged as a coil, and the number of coil turns in the or each reactor may be defined to configure the inductance value of the or each reactor so as to balance the inductance values of the current-conductive branches.

It will be appreciated that the number of coil turns in the or each reactor arranged as a coil may range from a single coil turn to a plurality of coil turns.

In further embodiments of the invention, the electrical connection members may be dimensioned to configure their respective inductance values so as to balance the inductance values of the current-conductive branches. For example, the lengths of the electrical connection members may be dimensioned to configure their respective stray inductance values.

The gas tube switches may be positioned relative to the terminals to simplify the configuration of the inductance value of each electrical connection member to balance the inductance values of the current-conductive branches. For example, the gas tube switches may be positioned relative to the terminals to simplify the configuration of the inductance value of the or each reactor and/or the dimensioning of the electrical connection members required to configure the inductance value of each electrical connection member so as to balance the inductance values of the current-conductive branches.

Such positioning of the gas tube switches may be carried out in a number of different ways, non-limiting examples of which are described as follows.

In a first non-limiting example, the gas tube switches may be positioned in a symmetrical arrangement about a reference axis extending through the terminals.

In a second non-limiting example, the gas tube switches may be positioned in a circular arrangement about a reference axis extending through the terminals.

In a third non-limiting example, the gas tube switches may be positioned in a radial arrangement about a reference axis extending through the terminals.

In a fourth non-limiting example, the gas tube switches may be arranged to be equidistant from a reference axis extending through the terminals.

In a fifth non-limiting example, the gas tube switches may be arranged to be equidistant from the first terminal, and the gas tube switches are arranged to be equidistant from the second terminal.

It will be appreciated that the switching apparatus of the invention may be used in a wide range of switching applications.

In a preferred embodiment of the invention, the switching apparatus may be configured for use in a HVDC application. In such an embodiment, the number of current-conductive branches of the switching apparatus may be configured so that the switching apparatus has a current rating suitable for a HVDC application.

The ability of the switching apparatus of the invention to control the distribution of current between the current-conductive branches improves the compatibility of gas tube switches with the high current rating requirements of HVDC applications.

It will be appreciated that the use of the terms "first" and "second", and the like, in this patent specification is merely intended to help distinguish between similar features (e.g. the first and second terminals), and is not intended to indicate the relative importance of one feature over another feature, unless otherwise specified.

Preferred embodiments of the invention will now be described, by way of non-limiting examples, with reference to the accompanying drawings in which.

The figures are not necessarily to scale, and certain features and certain views of the figures may be shown exaggerated in scale or in schematic form in the interests of clarity and conciseness.

The following embodiments of the invention are used primarily in HVDC applications, but it will be appreciated that the following embodiments of the invention are applicable mutatis mutandis to other switching applications.

Figure 1:
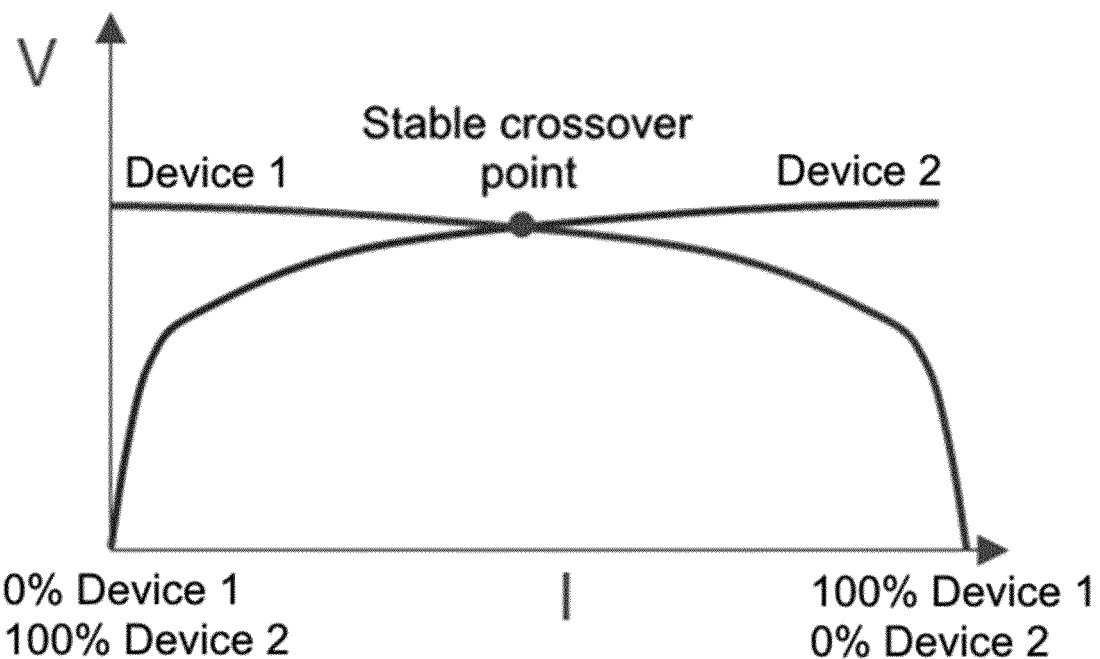
FIG. 1 illustrates the current sharing characteristics of parallel-connected semiconductor switches.
Figure 2:
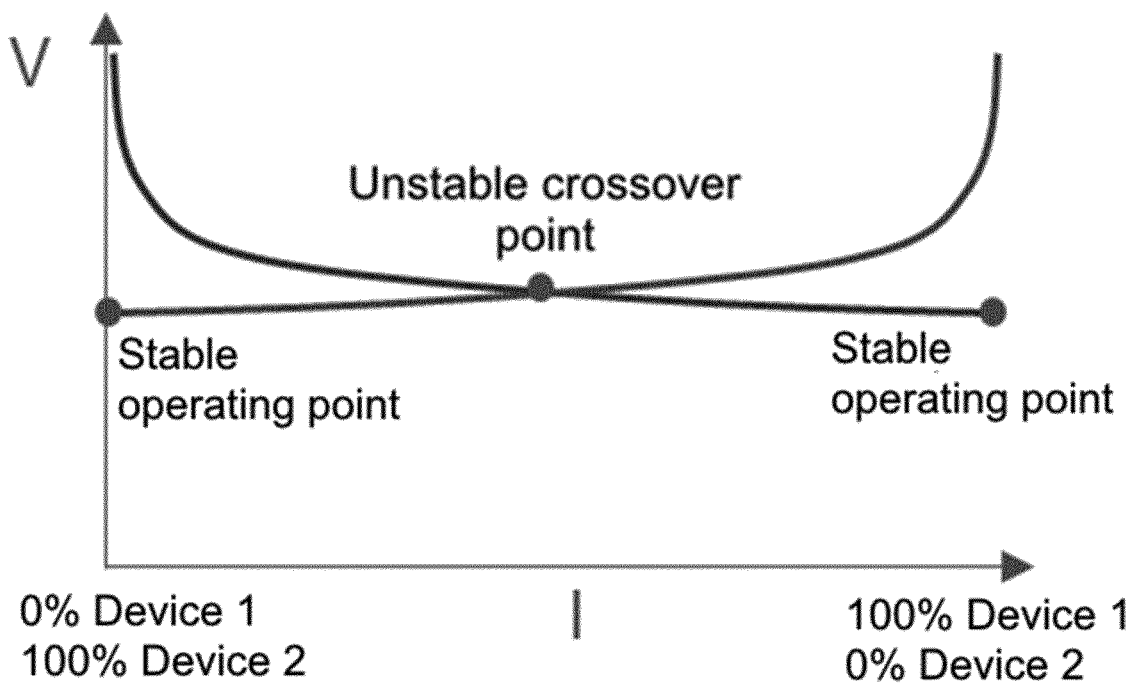
FIG. 2 illustrates the current sharing characteristics of parallel-connected gas tube switches.
Figure 3:
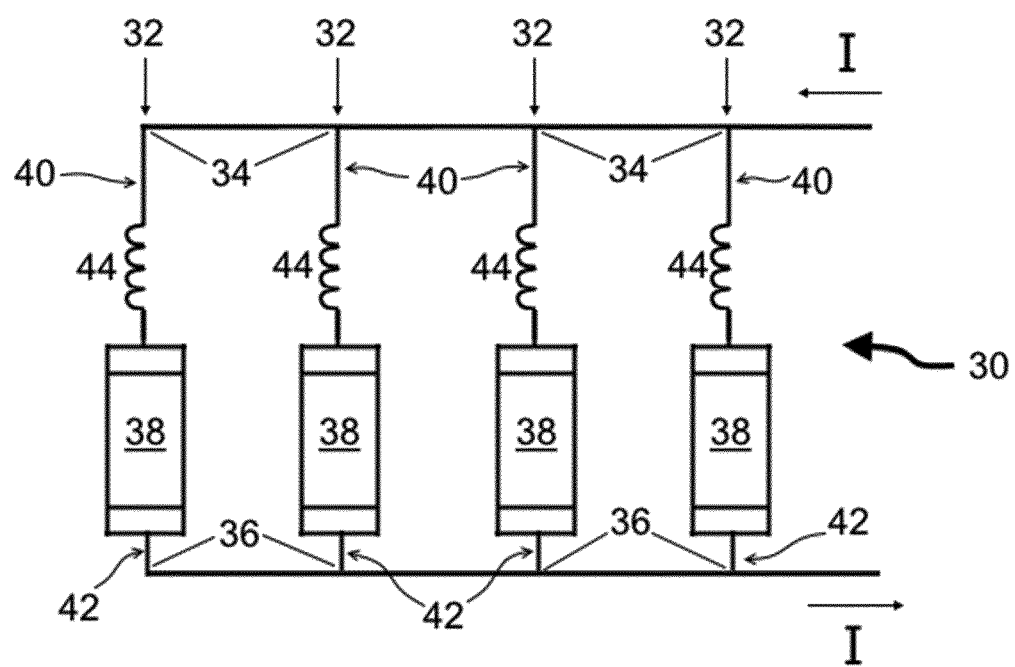
FIG. 3 shows schematically a switching apparatus according to a first embodiment of the invention.

A switching apparatus according to a first embodiment of the invention is shown in FIG. 3 and is designated generally by the reference numeral 30.

The switching apparatus 30 comprises a plurality of current-conductive branches 32 that are connected in parallel between first and second terminals 34,36. Each current-conductive branch 32 includes a respective gas tube switch 38. Each gas tube switch 38 includes a chamber enclosing an ionizable gas, and is configured to generate a plasma of ionized gas to facilitate a controlled current flow through the gas tube switch 38. In the embodiment shown, there are four current-conductive branches 32, but it will be appreciated that the number of current-conductive branches 32 of the switching apparatus 30 may vary.

Each current-conductive branch 32 includes a first electrical connection member 40 that connects an electrode of the gas tube switch 38 to the first terminal 34, and a second electrical connection member 42 that connects another electrode of the gas tube switch 38 to the second terminal 36. The first electrical connection member 40 includes electrically conductive wiring and a series reactor 44, while the second electrical connection member 42 includes electrically conductive wiring.

Each series reactor 44 is arranged as a coil. The number of coil turns in each reactor 44 is defined to configure the inductance value of each reactor 44 so as to balance the inductance values of the current-conductive branches 32. More particularly, the number of coil turns in each reactor 44 is defined by taking into consideration the stray inductance present in the respective electrical connection member 40,42 so as to achieve a balance between the overall inductance values of the current-conductive branches 32.

Configuring the inductance values of the reactors 44 to balance the inductance values of the current-conductive branches 32 advantageously improves the sharing of current I between the current-conductive branches 32 based on gas tube switches 38, thus beneficially improving the reliability of the "gas tube switch"-based switching apparatus 30.

Figure 4:
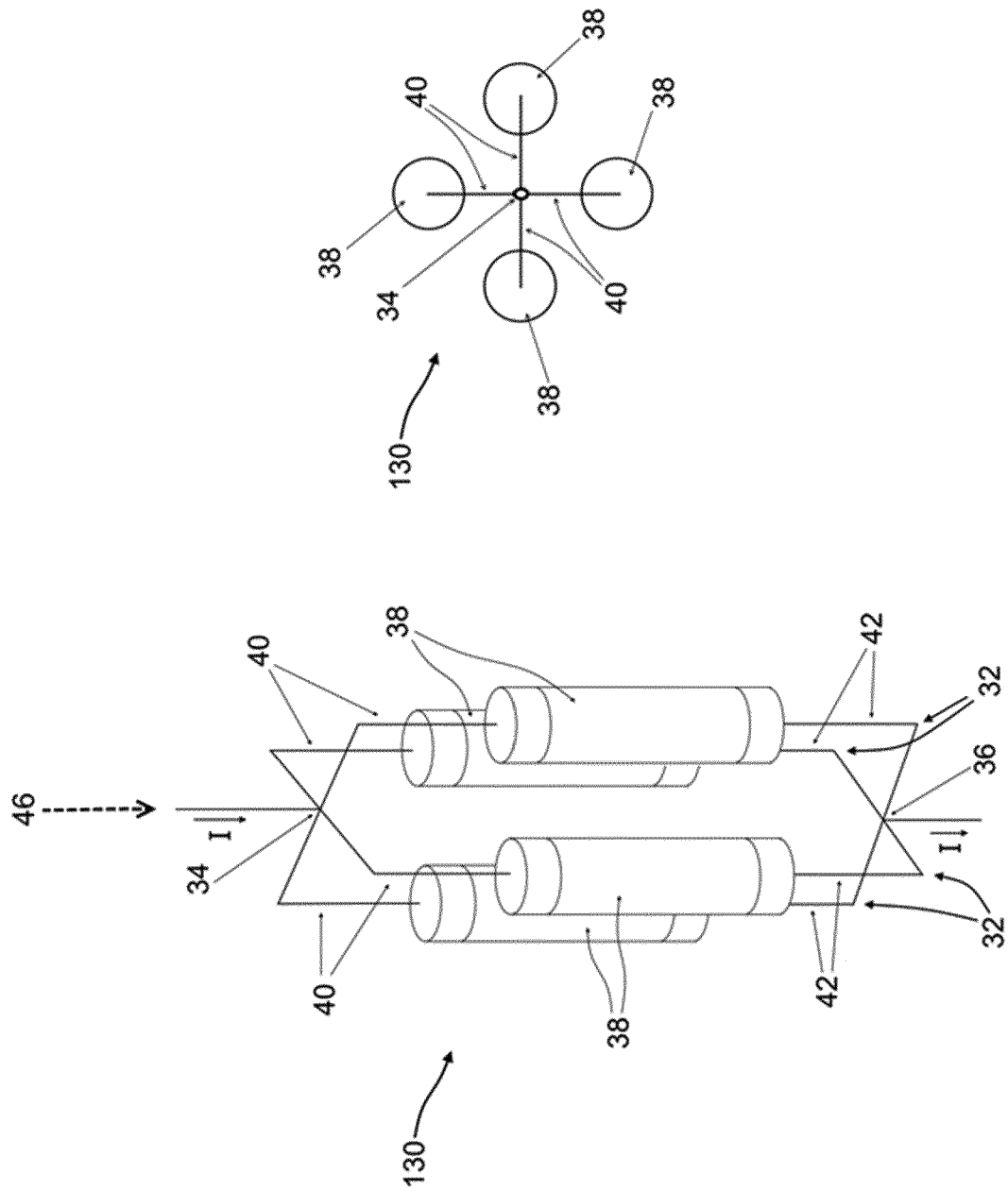
FIG. 4 shows schematically a switching apparatus according to a second embodiment of the invention.

A switching apparatus according to a second embodiment of the invention is shown in FIG. 4 and is designated generally by the reference numeral 130.

The switching apparatus 130 comprises a plurality of current-conductive branches 32 that are connected in parallel between first and second terminals 34,36. Each current-conductive branch 32 includes a respective gas tube switch 38. Each gas tube switch 38 includes a chamber enclosing an ionizable gas, and is configured to generate a plasma of ionized gas to facilitate a controlled current flow through the gas tube switch 38. In the embodiment shown, there are four current-conductive branches 32, but it will be appreciated that the number of current-conductive branches 32 of the switching apparatus 130 may vary.

Each current-conductive branch 32 includes a first electrical connection member 40 that connects an electrode of the gas tube switch 38 to the first terminal 34, and a second electrical connection member 42 that connects another electrode of the gas tube switch 38 to the second terminal 36. Each of the first and second electrical connection members 40,42 includes electrically conductive wiring.

The gas tube switches 38 are positioned in a symmetrical, radial arrangement about a reference axis 46 extending through the terminals 34,36, such that the gas tube switches 38 are arranged to be equidistant from the reference axis 46, equidistant from the first terminal 34, and equidistant from the second terminal 36. Meanwhile the lengths of the electrical connection members 40,42 are dimensioned to configure their respective inductance values so as to balance the stray inductances present in the electrical connection members 40,42 and therefore balance the overall inductance values of the current-conductive branches 32.

The above symmetrical, radial arrangement of the gas tube switches 38 makes it easier to define the lengths of the electrical connection members 40,42 to configure the inductance value of each electrical connection member 40,42 so as to balance the overall inductance values of the current-conductive branches 32, while at the same time providing a compact arrangement of the gas tube switches 38.

Arranging the gas tube switches 38 in the above symmetrical, radial arrangement and dimensioning the electrical connection members 40,42 to balance the inductance values of the current-conductive branches 32 advantageously improves the sharing of current I between the current-conductive branches 32 based on gas tube switches 38, thus beneficially improving the reliability of the "gas tube switch"-based switching apparatus.

Figure 5:
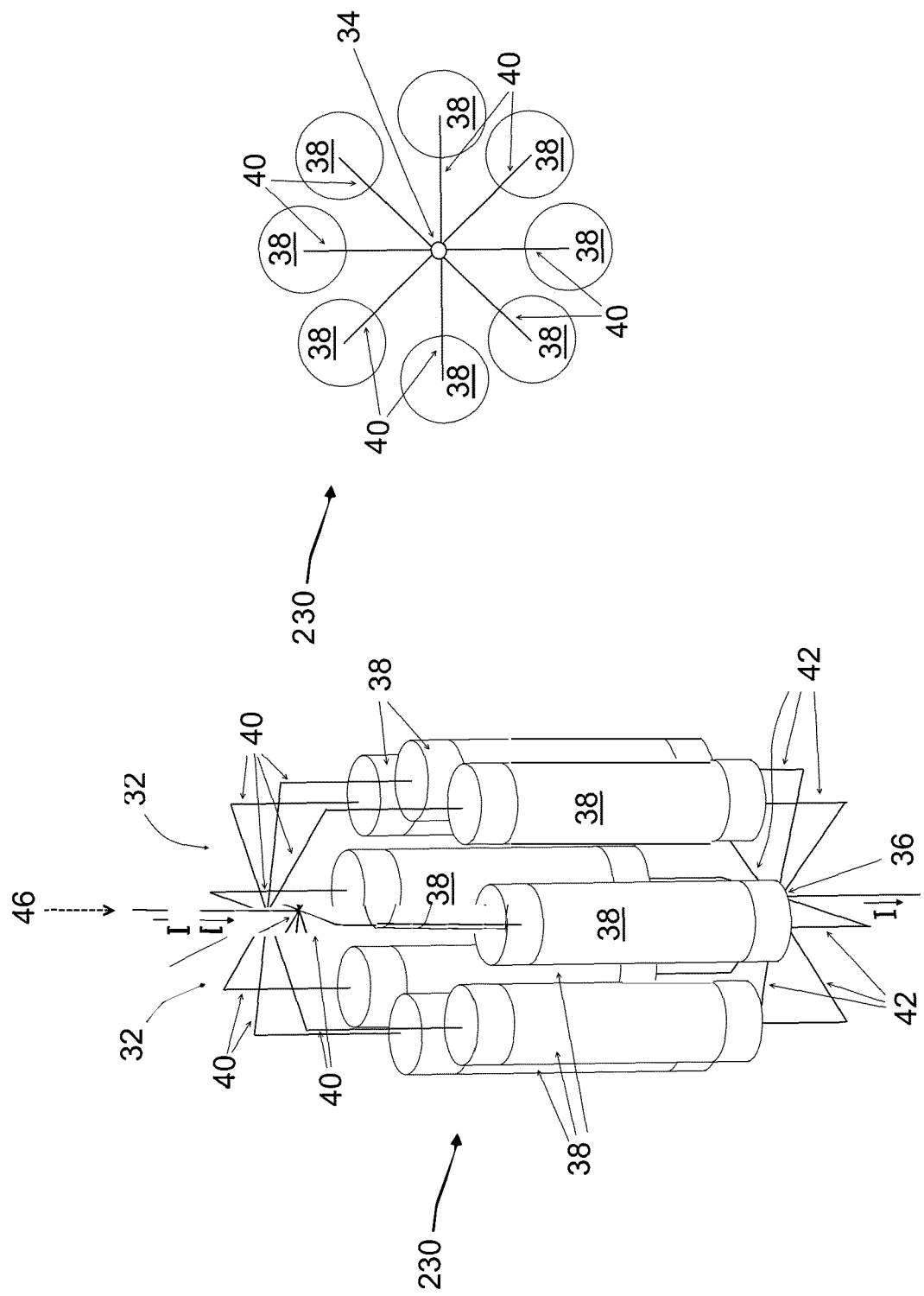
FIG. 5 shows schematically a switching apparatus according to a third embodiment of the invention.

A switching apparatus according to a third embodiment of the invention is shown in FIG. 5 and is designated generally by the reference numeral 230.

The switching apparatus 230 comprises a plurality of current-conductive branches 32 that are connected in parallel between first and second terminals 34,36. Each current-conductive branch 32 includes a respective gas tube switch 38. Each gas tube switch 38 includes a chamber enclosing an ionizable gas, and is configured to generate a plasma of ionized gas to facilitate a controlled current flow through the gas tube switch 38. In the embodiment shown, there are eight current-conductive branches 32, but it will be appreciated that the number of current-conductive branches 32 of the switching apparatus 230 may vary.

Each current-conductive branch 32 includes a first electrical connection member 40 that connects an electrode of the gas tube switch 38 to the first terminal 34, and a second electrical connection member 42 that connects another electrode of the gas tube switch 38 to the second terminal 36. Each of the first and second electrical connection members 40,42 includes electrically conductive wiring.

The gas tube switches 38 are positioned in a symmetrical, circular arrangement (and therefore also a radial arrangement) about a reference axis 46 extending through the terminals 34,36, such that the gas tube switches 38 are arranged to be equidistant from the reference axis 46, equidistant from the first terminal 34, and equidistant from the second terminal 36. Meanwhile the lengths of the electrical connection members 40,42 are dimensioned to configure their respective inductance values so as to balance the stray inductances present in the electrical connection members 40,42 and therefore balance the overall inductance values of the current-conductive branches 32.

The above symmetrical, circular arrangement of the gas tube switches 38 makes it easier to define the lengths of the electrical connection members 40,42 to configure the inductance value of each electrical connection member 40,42 so as to balance the overall inductance values of the current-conductive branches 32, while at the same time providing a compact arrangement of the gas tube switches 38.

Arranging the gas tube switches 38 in the above symmetrical, circular arrangement and dimensioning the electrical connection members 40,42 to balance the inductance values of the current-conductive branches 32 advantageously improves the sharing of current I between the current-conductive branches 32 based on gas tube switches 38, thus beneficially improving the reliability of the "gas tube switch"-based switching apparatus.

It will be appreciated that at least one embodiment of the invention may also be used in combination with at least one other embodiment of the invention.

The invention claimed is:

1. A switching apparatus comprising a plurality of current-conductive branches connected in parallel between first and second terminals, each current-conductive branch including at least one respective electrical connection member in series connection with at least one respective gas tube switch having at least two electrodes between the first and second terminals, wherein the inductance value of each electrical connection member is configured to balance the inductance values of the current-conductive branches to share a current among the plurality of current-conductive branches, wherein the gas tube switches are positioned in a symmetrical and radial arrangement about a reference axis extending through the terminals such that the gas tube switches are equidistant from the reference axis and the first and second terminals.

2. The switching apparatus according to claim 1 wherein at least one of the electrical connection members is or includes a reactor, wherein the inductance value of the or each reactor is configured to balance the inductance values of the current-conductive branches.

3. The switching apparatus according to claim 2 wherein the or each reactor is arranged as a coil, and the number of coil turns in the or each reactor is defined to configure the inductance value of the or each reactor so as to balance the inductance values of the current-conductive branches.

4. The switching apparatus according to claim 1 wherein the electrical connection members are dimensioned to configure their respective inductance values so as to balance the inductance values of the current-conductive branches.

5. The switching apparatus according to claim 1 wherein the gas tube switches are positioned in a circular arrangement about the reference axis extending through the terminals.

6. The switching apparatus according to claim 1 wherein the number of current-conductive branches of the switching apparatus is configured so that the switching apparatus has a current rating suitable for a high voltage direct current application.

* * * * *